Figure 6:
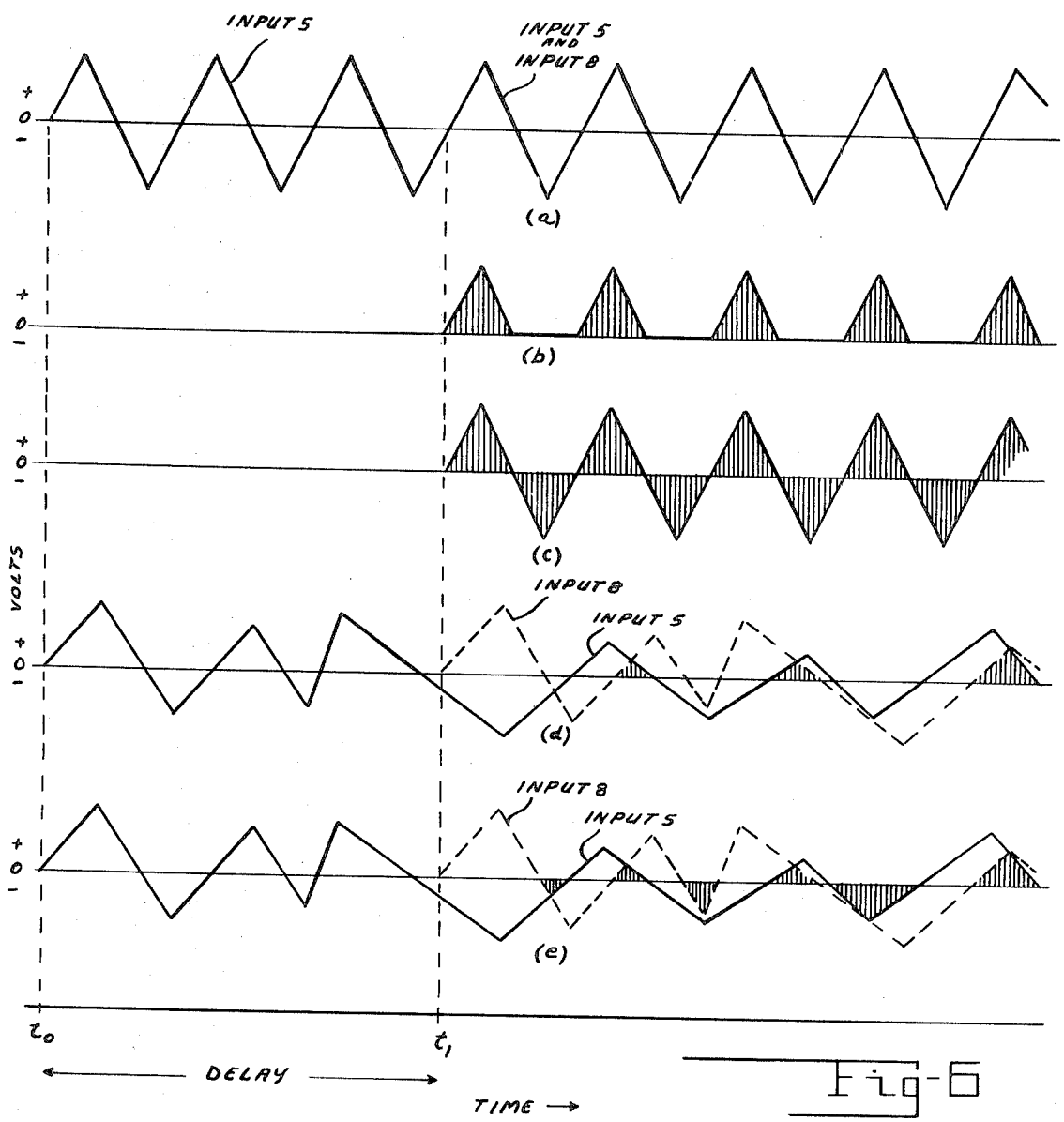

United States Patent

[11] 3,603,886

| | | |
|---|---|---|
| [72] | Inventor | Gene M. Norrs<br>R. D. #1, Verona, N.Y. 13478 |
| [21] | Appl. No. | 518,730 |
| [22] | Filed | Jan. 4, 1966 |
| [45] | Patented | Sept. 7, 1971 |

[54] NOISE REJECTING SIGNAL FILTER
5 Claims, 8 Drawing Figs.

[52] U.S. Cl. .................................................. 325/476,
325/324, 325/475
[51] Int. Cl. ........................................................ H04b 1/10
[50] Field of Search ........................................... 343/5, 6.5,
100.7; 307/88.5; 328/165, 167, 110; 325/323,
473, 474, 477, 324, 475, 476

[56] References Cited
UNITED STATES PATENTS
3,296,581  1/1967  Warner ........................ 325/474 X OTHER REFERENCES
Millman and Taub, Pulse and Digital Circuits (1956) pp. 399

Primary Examiner—Malcolm F. Hubler
Attorneys—Harry A. Herbert, Jr. and James S. Shannon ABSTRACT: A noise rejecting network for radio signals in which the signal is delayed by a multiple of the carrier wave half-period and applied along with the undelayed signal to an AND gate which produces an output only when the instantaneous polarities of the two inputs have a predetermined relationship and in which the output does not exceed the lesser instantaneous signal magnitude. A band-pass filter designed to pass only the signal frequencies is coupled to the output of the gate circuit. The use of a plurality of delays of different multiples of a half-period with additional inputs to the AND gate increases the noise rejection.

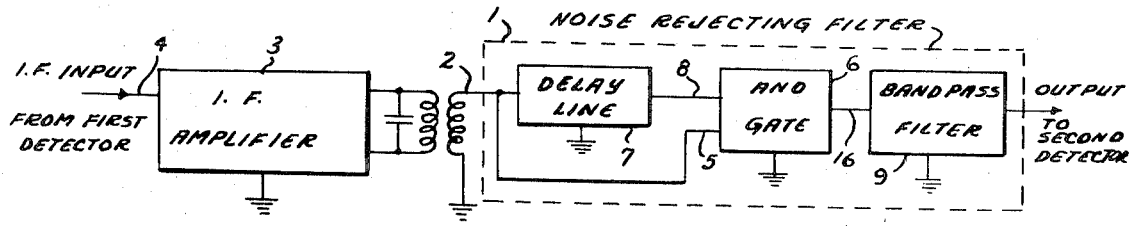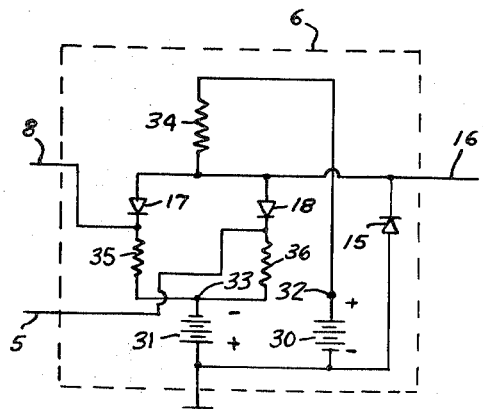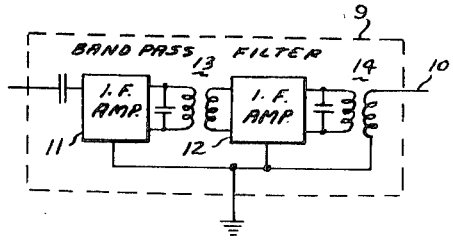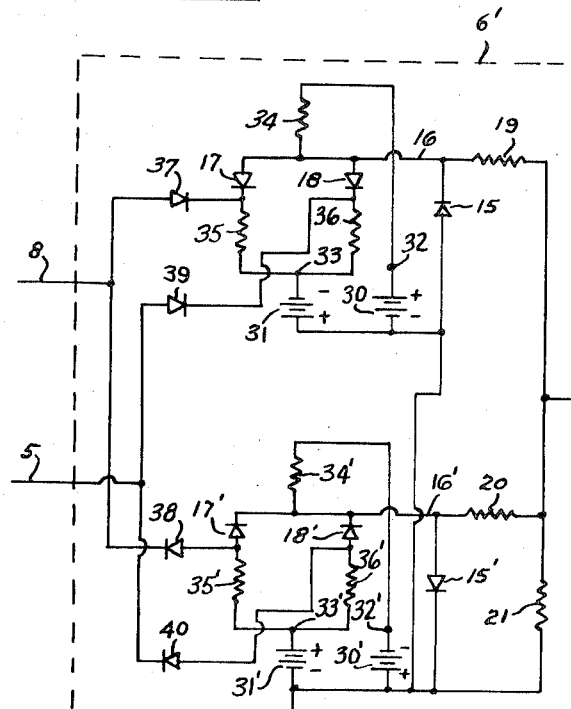

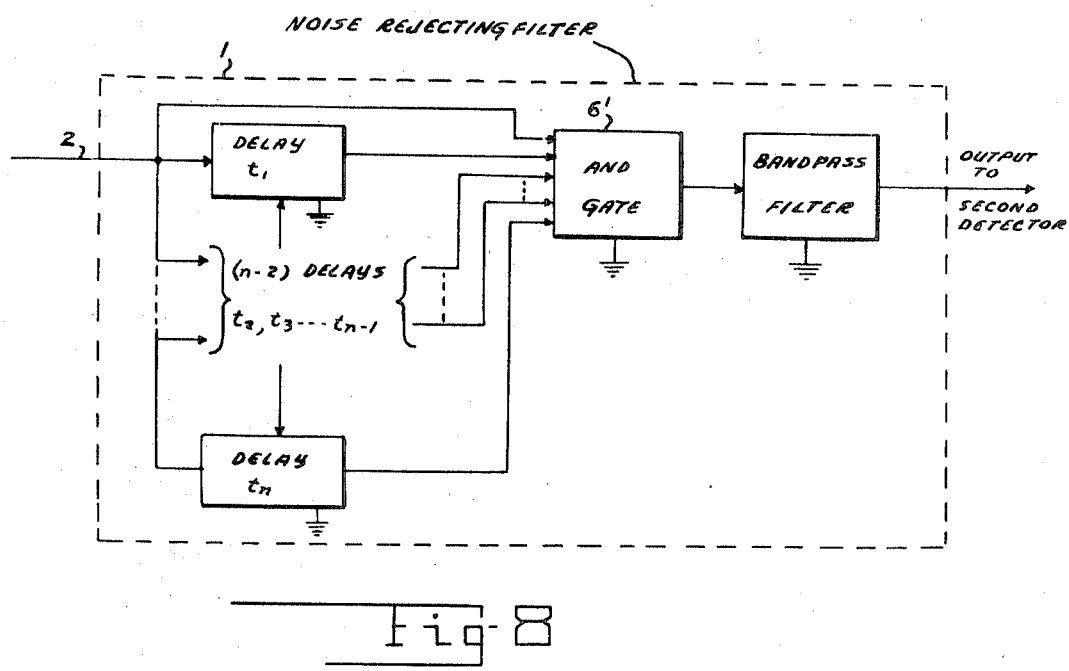

NOISE REJECTING SIGNAL FILTER

The invention described herein may be manufactured and used by or for the United States Government for governmental purposes without the payment to me of any royalty thereon.

The purpose of this invention is to provide a simple and effective means for resolving a radio signal in the presence of noise. It is particularly applicable to pulse signals such as employed in radar systems and in the transmission of digital information for example, but may also be used for radio signals amplitude modulated by speech or other complex waveforms.

Briefly stated, the basic method of the invention consists in delaying the received signal by a multiple of the carrier wave half-period and comparing the delayed and undelayed signals in a suitable gate circuit which produces an output only when the two signals have instantaneous polarities that are the same (or opposite depending upon the design of the gate circuit) and in which the output does not exceed the lesser instantaneous signal magnitude. The delay should be small relative to the pulse duration or relative to the minimum modulating frequency period in the case of complex wave modulation. Since the signal does not change appreciably in amplitude and remains coherent in phase over the delay interval, it passes the gate substantially unchanged. The noise on the other hand varies in both amplitude and phase during the delay interval and consequently is reduced in amplitude and modified in frequency characteristics by the gate circuit. A band-pass filter designed to pass only the signal frequencies is coupled to the output of the gate circuit. The residual noise in the gate circuit output is largely rejected by this filter as a result of its frequency change.

Figure 7:
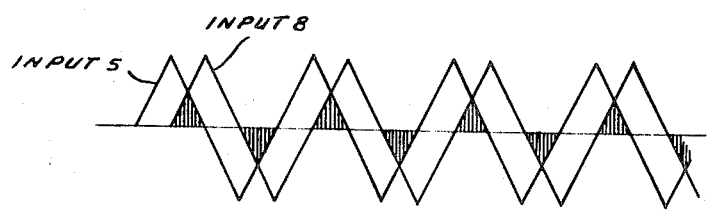

A more detailed description of the invention will be given with reference to the specific embodiments thereof shown in the accompanying drawings in which FIG. 1 is a block diagram of the noise rejecting filter circuit as applied to a superheterodyne receiver, FIG. 2 shows the desired operating characteristic of the gate circuit in FIG. 1, FIG. 3 is a schematic of a unipolar AND gate suitable for use in FIG. 1, FIG. 4 is a schematic of a bipolar AND gate suitable for use in FIG. 1, FIG. 5 shows a suitable design of the band-pass filter in FIG. 1, FIG. 6 gives waveforms illustrating the operation of the noise rejecting filter circuit, FIG. 7 shows operation with pulse pairs, and FIG. 8 is a filter with plural delay lines.

Referring to FIG. 1, the rectangle 1 illustrates the noise rejecting filter circuit in accordance with the invention as applied to a superheterodyne receiver. The input 2 of this circuit is coupled to the output of one or more tuned IF amplifier stages 3 of the superheterodyne receiver, the input 4 of the IF amplifier being coupled to the first detector (not shown) of the receiver. The IF amplifier has a band-pass characteristic designed to pass the IF carrier and sidebands of an amplitude modulated wave in conventional manner.

The amplitude modulated signal is applied directly to input 5 of AND gate 6 and through delay line 7 to input 8 of gate 6. The output of AND gate 6 is coupled through band-pass filter 9 to the output circuit 10 of the noise rejecting circuit. As seen in FIG. 5, the filter 9 may comprise IF amplifier stages 11 and 12 and resonant circuits 13 and 14, for example. The resonant circuits are tuned to the IF carrier frequency with sufficient breadth to their responses to pass the sidebands but to discriminate sharply against frequencies outside the pass band.

The desired response characteristic of AND gate 6 is illustrated in FIG. 2. Here two similar waves differing in phase are applied to input 5 and input 8 of the AND gate. The waves may be of any form but are shown as triangular waves for convenience. The AND gate is so designed that (1) both inputs must have the same polarities for an output to be produced and (2) the output does not exceed the lesser of the instantaneous values of the two input waves. Thus, the output for a bipolar AND gate of such design is illustrated by the shaded areas in FIG. 2. For a unipolar gate the shaded areas of one polarity would not appear.

The schematic of a suitable unipolar AND gate circuit having the above characteristics is shown in FIG. 3. Clamping diode 15 prevents output conductor 16 from going negative relative to ground. Clamping diodes 17 and 18 prevent output conductor 16 being more positive than the lower of the two cathode potentials of these diodes. The parameters of the circuit are so selected that with zero or negative potentials on input conductors 5 and 8 the cathodes of diodes 17 and 18 and output conductor 16 are at ground or zero potential. If the two waves of FIG. 2 are applied to this circuit the output is represented by the positive shaded areas of this figure.

Considering further the construction of the AND gate of FIG. 3, direct potential sources 30 and 31 establish first point 32 and second point 33 at direct potentials of opposite polarities relative to a point of reference potential (ground). Diodes 17 and 18 have their anodes connected in common. A resistor 34 is connected between point 33 and the anodes of the two diodes 17 and 18 which are poled in the direction of current flow between point 33 and point 32 through resistors 34, 35 and 36. Line 8 constitutes one input circuit connected between the cathode of diode 17 and ground, while line 5 constitutes the other input circuit connected between the cathode of diode 18 and ground. An output circuit 16 is connected between the common anodes of diodes 17 and 18 and ground. A clamping diode 15 connected between the common anodes and ground prevents the anodes assuming a potential relative to ground that is negative relative to ground.

FIG. 4 illustrates a bipolar AND gate 6' that may be used for gate 6 in FIG. 1. It comprises two oppositely poled unipolar gates of the type shown in FIG. 3 with their outputs added by a summing network composed of resistors 19, 20 and 21. If the two waves of FIG. 2 are applied to this circuit the output is represented by shaded areas of this figure.

The upper AND gate of FIG. 4 is identical in all respects to FIG. 3 described above. The lower AND gate is also identical to FIG. 3 except that points 32' and 33' have polarities opposite to points 32 and 33 in FIG. 3, and diodes 17', 18' and 15' are oppositely poled compared to the diodes 17, 18 and 15 of FIG. 3. Diodes 37 and 38 insure that the positive positions of the wave on line 8 go only to the upper AND gate and the negative portions only to the lower AND gate. Diodes 39 and 40 perform a similar function for the wave on input conductor 5.

The operation of the noise rejecting circuit 1 of FIG. 1 may be explained with the aid of the waveforms in FIG. 6. These waveforms are drawn for a signal in the form of a pulse of IF energy, using a straight line representation for simplicity. The pulse starts at time $t_0$ and ends at a time (not shown) later than $t_1$. Waveform (a) represents the periodic IF carrier wave which, combined with the complex aperiodic noise wave illustrated by the solid line in graph (d), is applied to the input circuit 2 of the noise rejecting circuit 1.

The carrier wave is applied directly to input 5 of AND gate 6 and, after a delay of $t_1-t_0$ in delay line 7, to input 8 of the gate circuit. As seen in the drawing, the delay in this case is an even multiple (6) of the carrier wave half-period. With this delay, the waves at inputs 5 and 8 have the same phase so that waveform (a) starting at $t_1$ represents the two inputs to gate 6 superimposed with two inputs of the same amplitude and phase, the output of gate 6, as already explained, is as shown by waveform (b) for a unipolar gate such as shown in FIG. 3 or by waveform (c) for a bipolar gate such as shown in FIG. 4.

Both waves (b) and (c) have the same frequency as. wave (a), i.e. the IF carrier frequency, and readily pass band-pass filter 9 which is centered on this frequency. In the case of waveform (b) the output of filter 9 is of the same form as waveform (a) since the resonant circuits of the filter (FIG. 5) restore the missing half-cycles. Although there is a 6 db. loss in signal voltage with the unipolar gate as compared to the bipolar gate, this is of no consequence since the level can be restored by increasing the gain in the IF amplifiers of filter 9. The desired signal is therefore passed by the noise rejecting circuit 1 substantially unchanged.

The noise component of the received signal is largely rejected by the circuit 1. Since noise is random in nature, the delayed and undelayed noise voltages applied to gate circuit 6 are constantly varying in relative amplitude and phase, as illustrated in FIG. 6 (*d*) and (*e*) wherein the undelayed and delayed noise voltages are represented by the solid and dashed lines respectively. As a result, the gate circuit requirement that the two inputs be of the same polarity to produce an output is met over a much smaller portion of the total time than in the case of the desired signal illustrated in FIG. 6 (*a*), (*b*) and (*c*), and therefore only a small portion of the noise is passed by the gate circuit. This residual noise is represented by the shaded areas in FIG. 6 (*d*) and (*e*), graph (*d*) corresponding to a unipolar gate circuit such as shown in FIG. 3 and graph (*e*) corresponding to a bipolar gate circuit such as shown in FIG. 4.

In addition to a reduction in amplitude, the residual noise in the gate output has also been changed in frequency characteristics so that a greater portion of the noise energy falls outside the pass band of filter 9. This further reduces the magnitude of the noise component in the output 10 so that the overall result produced by the noise rejecting filter circuit 1 is a considerable increase in the signal-to-noise ratio.

This method may also be employed with signals consisting of a pair of closely spaced pulses such, for example, as a radar IFF signal. In this case the delay of line 7 is made exactly equal to the interval between the start of the first pulse and the start of the second pulse. It is necessary that the two pulses start with the same phase. This application is illustrated in FIG. 7 where (*a*) represents the IF pulse pair applied to the input of the noise rejecting filter 1, (*b*) represents the delayed and undelayed pulses, superimposed, as applied to the AND gate and (*e*) represents the output of the noise rejecting circuit 1. In this case the delay introduced does not reduce the duration of the output pulse as in the single pulse case. In addition to noise suppression, the circuit also acts in this case as a decoder since an output is produced only for a pair of input pulses with specified separation.

The noise rejecting circuit 1, as already stated, may also be used for radio signals amplitude modulated with voice or other complex waveforms. For such use the delay must be shorter than the period of the highest modulation frequency. In this case some distortion may be noted in the detected envelope.

A sharper frequency pass band for the signal with a resulting greater rejection of the noise energy may be obtained by using more than one delay in the noise rejecting filter 1, as illustrated in FIG. 8. In this embodiment *n* delays are indicated requiring an AND gate with (*n*+1) inputs. The delays are different multiples of the carrier half-period. The rules governing the operation of AND gate 6' are the same as given above for AND gate 6. The design of the AND gate may be an extension of the designs shown in FIGS. 3 and 4, or any other design satisfying the operating requirements may be used.

I claim:

1. A noise rejecting circuit for an amplitude modulated high frequency signal comprising: an AND gate having two input circuits and an output circuit, said AND gate producing an output voltage only in the presence of two input voltages of a predetermined polarity relationship and limiting said output voltage to the lesser of the two input voltages; means producing a delay equal to a multiple of the half-period of said high frequency signal; means applying said signal directly to one input of said gate and through said delay means to the other input of said gate; and a filter passing only said high frequency signal and its sidebands coupled to the output circuit of said gate, the output of said filter constituting the output of said noise rejecting circuit.

2. Apparatus as claimed in claim 1 in which said predetermined polarity relationship is that said input voltages are of the same polarity and in which said multiple is an even number.

3. Apparatus as claimed in claim 2 in which said AND gate comprises means establishing first and second points having direct potentials of opposite polarities relative to a point of reference potential; two diodes having one pair of like electrodes connected in common; a resistor connected between said first potential point and said common electrodes; a resistor connected between the other electrode of each diode and said second potential point; said diodes being poled in the direction of current flow between said first and second points; a pair of input circuits, one connected between the said other electrode of one of said diodes and said point of reference potential and the other connected between the said other electrode of the other of said diodes and said point of reference potential; an output circuit connected between the said common electrodes and said point of reference potential; and clamping means connected between said common electrodes and said point of reference potential for preventing said common electrodes from assuming a potential relative to said reference potential point having the polarity of said second potential point relative to said reference potential point.

4. A noise rejecting circuit for an amplitude modulated high frequency signal, comprising: a plurality of delay means producing delays that are different multiples of the half-period of said high frequency signal; an AND gate having one more input circuit than there are delay means and an output circuit, said AND gate producing an output voltage only in the presence of simultaneous input voltages of a predetermined polarity relationship on all its input circuits and limiting said output voltage to the least of said input voltages; means for applying said high frequency signal directly to one of said gate input circuits and to said delay means in parallel; means for applying the delayed signals from said delay means to the remaining inputs of said gate; and a filter passing only said high frequency signal and its sidebands coupled to the output circuit of said gate, the output of said filter constituting the output of said noise rejecting circuit.

5. The method of resolving a radio signal of constant carrier frequency in the presence of noise, comprising: delaying said signal by a multiple of the carrier half-period; comparing the instantaneous magnitudes and the instantaneous polarities of the delayed and the undelayed signals and producing, only when the polarities have a predetermined relationship, an output signal of instantaneous magnitude not exceeding the lesser of the instantaneous magnitudes of the delayed and undelayed signals; and selecting from said output signal only signals of those frequencies lying within a frequency band just wide enough to include said radio signal.